United States Patent [19]
Ahn

[11] Patent Number: 5,729,300
[45] Date of Patent: Mar. 17, 1998

[54] DOUBLE-SCREEN SIMULTANEOUS VIEWING CIRCUIT OF A WIDE-TELEVISION

[75] Inventor: Deok-Yong Ahn, Suwon, Rep. of Korea

[73] Assignee: Samsung Electronics Co., Ltd., Kyungki-do, Rep. of Korea

[21] Appl. No.: 481,079

[22] Filed: Jun. 7, 1995

[51] Int. Cl.$^6$ .............................. H04N 5/45; H04N 5/445
[52] U.S. Cl. ......................... 348/564; 348/565; 348/567
[58] Field of Search .................................. 348/563–568, 348/588; H04N 5/45, 5/445

[56] References Cited

U.S. PATENT DOCUMENTS

| | | | |
|---|---|---|---|
| 4,796,089 | 1/1989 | Imai et al. | 348/565 |
| 5,040,067 | 8/1991 | Yamazaki | 348/588 |
| 5,047,858 | 9/1991 | Aimonoya | 348/568 |
| 5,363,143 | 11/1994 | Duffield | 348/564 |
| 5,504,535 | 4/1996 | Abe | 348/565 |

*Primary Examiner*—Michael H. Lee
*Attorney, Agent, or Firm*—Sughrue, Mion, Zinn, Macpeak & Seas, PLLC

[57] ABSTRACT

A double-screen simultaneous viewing circuit for simultaneously displaying two pictures on the main screen of a extra-wide television is provided. The two pictures each have a 4-to-3 aspect ratio and are displayed on left and right subscreens of the main screen. The viewing circuit includes first and second analog-to-digital converters for respectively converting first and second video signals of the two pictures into digital signals. The first and second video signals are respectively converted according to first and second clock signals which have equal frequencies and which are respectively synchronized with synchronizing signals of the first and second video signals. The digital video signals are stored in first and second memories based on the first and second clock signals, and the digital video signals are read from the first and second memories based on a third clock signal. The third clock signal is synchronized with the synchronizing signals of the first video signal and has a frequency twice as high as the frequency of the first clock signal. The digital video signals are converted into first and second analog signals by first and second digital-to-analog converters based on the third clock signal, and a switch alternately outputs the first and second analog signals according to an horizontal synchronizing signal of the first video signal. Subsequently, the analog signals are respectively displayed on the left and right subscreen as the two pictures.

26 Claims, 2 Drawing Sheets

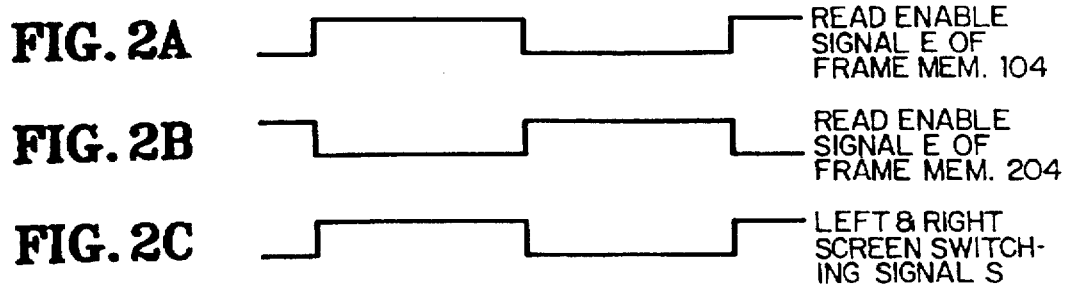
FIG. 2A — READ ENABLE SIGNAL E OF FRAME MEM. 104
FIG. 2B — READ ENABLE SIGNAL E OF FRAME MEM. 204
FIG. 2C — LEFT & RIGHT SCREEN SWITCHING SIGNAL S
FIG. 3A  FIG. 3B  FIG. 3C
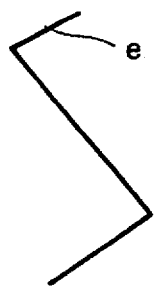
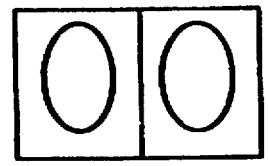
FIG. 4A  FIG. 4B  FIG. 4C
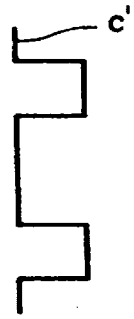
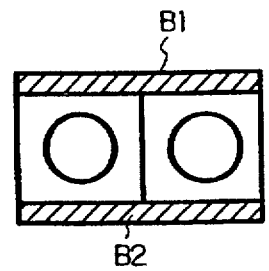

DOUBLE-SCREEN SIMULTANEOUS VIEWING CIRCUIT OF A WIDE-TELEVISION

FIELD OF THE INVENTION

The present invention relates to a double-screen simultaneous viewing circuit for simultaneously displaying two pictures having a 4-to-3 aspect ratio on the main screen of an extra-wide television having a 16-to-9 aspect ratio. In particular, the main screen of the extra-wide television is divided into left and right subscreens, and the two pictures are simultaneously displayed on the subscreens.

BACKGROUND OF THE INVENTION

Conventional extra-wide televisions having a main screen with a 16-to-9 aspect ratio are able to display pictures having a 4-to-3 aspect ratio. In some extra-wide televisions, a picture having a 4-to-3 aspect ratio is converted into a picture having a 16-to-9 aspect ratio, and the converted picture is displayed on the entire area of the main screen. Accordingly, only one picture is displayed on the television at a time.

Other extra-wide televisions can simultaneously display a plurality of pictures having 4-to-3 aspect ratios as follows. One picture having a 4-to-3 aspect ratio is transmitted to the television on a first channel, is converted into a picture having a 16-to-9 aspect ratio, and is displayed on the entire main screen. When multiple pictures are to be displayed on the television, only a portion of the picture on the first channel is displayed on a left subscreen of the extra-wide television. Typically, the left subscreen has a 12-to-9 aspect ratio and thus covers the entire main screen in the vertical direction and 75 percent of the main screen in the horizontal direction. Accordingly, only 75 percent of the picture on the first channel is displayed.

Other pictures having a 4-to-3 aspect ratio are displayed on the remaining portion of the main screen (i.e. the right subscreen). Ordinarily, the right subscreen has a 4-to-9 aspect ratio and covers the entire main screen in the vertical direction and 25 percent of the main screen in the horizontal direction. Moreover, up to three pictures transmitted by other channels can be displayed as three picture-in-picture screens in the right subscreen. Specifically, the right subscreen having a 4-to-9 aspect ratio is subdivided into three picture-in-picture screens each having a 4-to-3 aspect ratio by horizontally dividing the right subscreen into three equal areas. Thus, the three picture-in-picture screens are vertically aligned with each other in the right subscreen.

However, since each of the three picture-in-picture screens are small, the pictures displayed in the screens are compressed and have a low resolution. As a result, the picture-in-picture screens cannot be satisfactory viewed and are only used for searching among various channels.

Accordingly, it is desirable to simultaneously display two entire pictures having 4-to-3 aspect ratios on left and right subscreens, rather than displaying a main picture and several picture-in-picture screens on an extra-wide television.

SUMMARY OF THE INVENTION

The object of the present invention is to provide a double-screen simultaneous viewing circuit which can divide a main screen into a left and right subscreen each having a 8-to-9 aspect ratio, wherein two pictures of equal size can be simultaneously displayed. Furthermore, even though each of the left and right subscreens is smaller than the main screen of the television, they are larger than the typical picture-in-picture screens. Therefore, the left and the right subscreens can simultaneously display two different pictures having substantially high resolution.

It is a further object of the present invention to display two pictures having a 4-to-3 aspect ratio on left and right subscreens divided from a main screen having a 16-to-9 aspect ratio.

To accomplish these objects, there is provided a double-screen simultaneous viewing circuit comprising:

first and second analog-to-digital converting means for respectively converting first and second video signals into first and second digital signals, wherein said first and second digital signals are respectively output from said first and second analog-to-digital converting means based on first and second clock signals and wherein said first and second clock signals are respectively synchronized with synchronizing signals of said first and second video signals;

first and second memory means for respectively storing said first and second digital signals output from said first and second analog-to-digital converting means, wherein said first and second digital signals are stored based on said first and second clock signals, wherein said first and second digital signals are respectively read from said first and second memory means based on a third clock signal which is synchronized with said synchronizing signals of said first video signal;

first and second digital-to-analog converting means for respectively converting said first and second digital signals output from said first and second memory means into first and second analog signals, wherein said first and second digital-to-analog converting means outputs said first and second analog signals based on said third clock signal; and switching means for inputting said first and second analog signals output from said first and second digital-to-analog converting means and for alternately outputting said first and second analog signals based on a left and right screen switching signal.

Also, the double-screen simultaneous viewing circuit may further comprise:

deflecting means for generating horizontal and vertical deflection signals which are synchronized with said synchronizing signals of said first video signal, wherein said deflecting means generates a first vertical deflection signal when said double-screen simultaneous viewing circuit is operating in a single-screen viewing mode and generates a second vertical deflection signal when said double-screen simultaneous viewing circuit is operating in a double-screen simultaneous viewing mode, wherein said second vertical deflection signal vertically compresses said two pictures.

BRIEF DESCRIPTION OF THE DRAWINGS

The above objects and advantages of the present invention will become more apparent upon reading the description of a preferred embodiment below, along with reference to the attached drawings in which:

FIG. 2A illustrates the waveforms of the read enable signal of a first frame memory output from a control signal generator shown in FIG. 1;

FIG. 2B illustrates the read enable signal of a second frame memory output from the control signal generator shown in FIG. 1;

FIG. 2C illustrates the left and right screen switching signal output from the control signal generator shown in FIG. 1;

FIG. 3A illustrates a vertical deflection current output by a deflector shown in FIG. 1;

FIG. 3B illustrates a vertical blanking signal output by the control signal generator shown in FIG. 1;

FIG. 3C shows pictures displayed on a screen based on the vertical deflection current shown in FIG. 3A and the vertical blanking signal shown in FIG. 3B;

FIG. 4A illustrates a modified vertical deflection current output by a deflector shown in FIG. 1;

FIG. 4B illustrates a modified vertical blanking signal output by the control signal generator shown in FIG. 1; and FIG. 4C shows pictures displayed on a screen based on the modified vertical deflection current shown in FIG. 4A and the modified vertical blanking signal shown in FIG. 4B.

DETAILED DESCRIPTION OF THE PREFERRED EMBODIMENT

Figure 1:
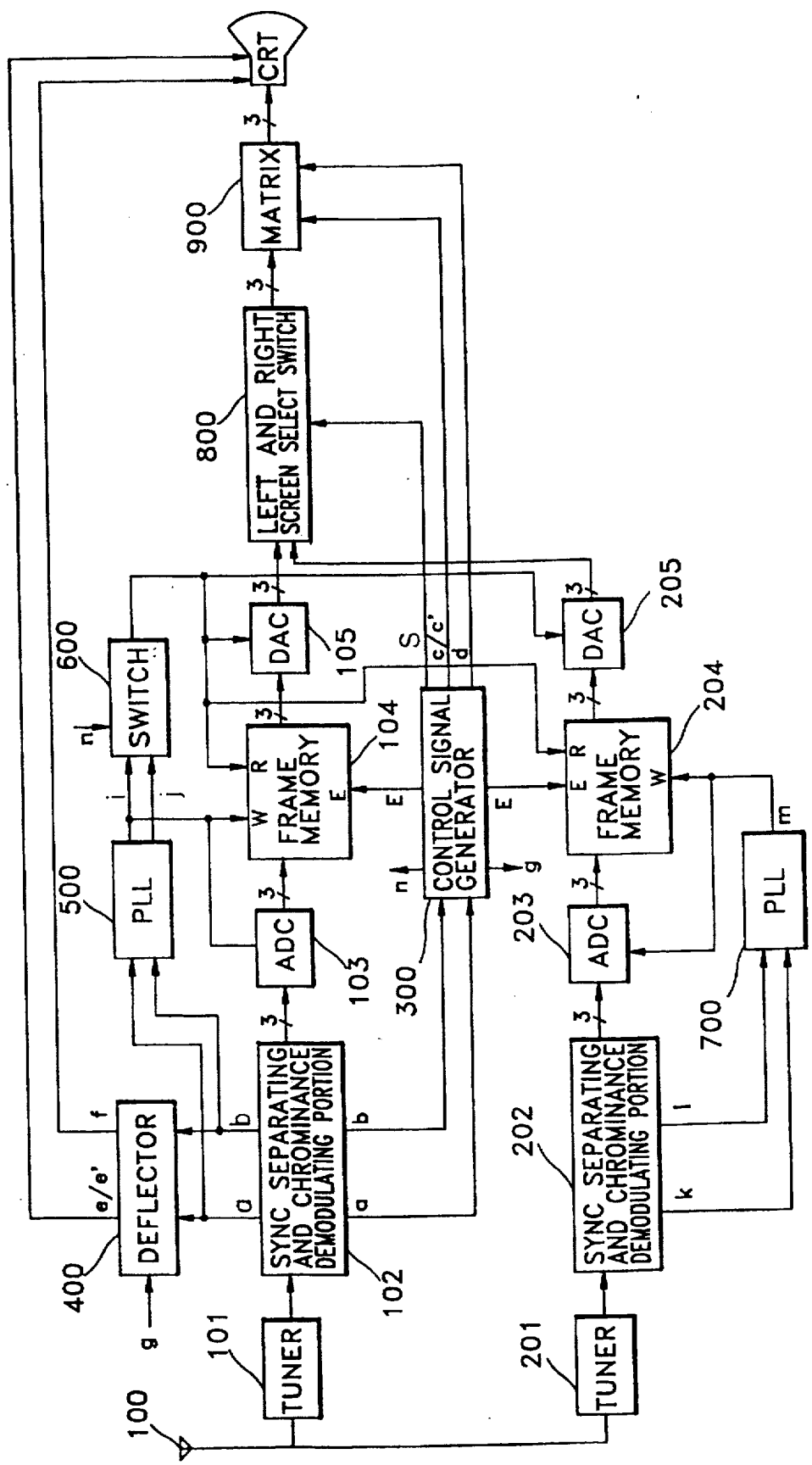
FIG. 1 is a block diagram showing a preferred embodiment of a double-screen simultaneous viewing circuit according to the present invention.

The present invention will be described in more detail with reference to the attached drawings.

FIG. 1 is a block diagram showing a preferred embodiment of a double-screen simultaneous viewing circuit according to the present invention. The double-screen simultaneous viewing circuit comprises first and second tuners 101 and 201, first and second sync separating and chrominance demodulating portions 102 and 202, first and second analog-to-digital converters (ADCs) 103 and 203, first and second frame memories 104 and 204, first and second digital-to-analog converters (DACs) 105 and 205, a control signal generator 300, a deflector 400, first and second phase locked loops 500 and 700, a switch 600, a left and right screen select switch 800, and a matrix 900.

The first and second tuners 101 and 201 input television signals received through an antenna 100 and respectively convert the television signals for selected channels into first and second IF signals. Subsequently, the first and second IF signals are output to the first and second sync separating and chrominance demodulating portions 102 and 202. The first and second sync separating and chrominance demodulating portions 102 and 202 demodulate the first and second IF signals and produce synchronizing signals and first and second video signals.

The first and second ADCs 103 and 203 respectively convert the video signals output from the sync separating and chrominance demodulating portions 102 and 202 into digital signals, and the digital signals are respectively output to the first and second frame memories 104 and 204 which store the digital video signals. When the digital video signals are read from the frame memories 104 and 204, they are output to the first and second DACs 105 and 205. The DACs 105 and 205 respectively convert the first and second digital video signals into first and second analog signals. The analog signals are input by the left and right screen select switch 800 which alternatively outputs the first analog video signal and the second analog video signal.

The matrix 900 inputs the analog signals output by the left and right screen select switch 800. The luminance signal components and the color difference signal components of the analog signals are converted by the matrix 900 into an RGB chrominance signal, and the RGB chrominance signal is output as visual information to a screen of a cathode ray tube (CRT) having a 16-to-9 aspect ratio.

The control signal generator 300 generates control signals to control the operations of the various devices of the double-screen simultaneous viewing circuit. For example, the generator 300 outputs a read enable signal E to the first and second frame memories 104 and 204 and a double-screen simultaneous viewing on/off signal g to the deflector 400. In addition, the generator 300 outputs a vertical blanking signal c, a horizontal blanking signal d, and a left and right screen switching signal S based on the vertical and horizontal synchronizing signal a and b output from first sync separating and chrominance demodulating portion 102.

When the double-screen simultaneous viewing on/off signal g is "on" (i.e. when the a double-screen simultaneous viewing mode is active), the control signal generator 300 outputs a modified vertical blanking signal c' to the matrix 900 and a simultaneous viewing mode signal n to the switch 600.

The deflector 400 receives as input the double-screen simultaneous viewing on/off signal g output from the control signal generator 300 as well as the vertical synchronizing signal a and the horizontal synchronizing signal b output from first sync separating and chrominance demodulating portion 102. Based on the input signals a, b, and g, the deflector 400 generates a vertical deflection current e and a horizontal deflection current f. Both the vertical deflection current e and the horizontal deflection current f are supplied to the deflection coils of the CRT. When the double-screen simultaneous viewing on/off signal g is "on", the deflector 400 outputs a modified vertical deflection current e' corresponding to the modified vertical blanking signal c' output from control signal generator 300.

A first phase locked loop 500 also receives as input the synchronizing signals a and b output from the first sync separating and chrominance demodulating portion 102 and outputs a first clock signal i and a third clock signal j. A switch 600 selectively outputs either the first clock signal i or the third clock signals j and supplies the selected clock signal to first and second frame memories 104 and 204. The first and second frame memories 104 and 204 input the selected clock as a read clock R.

A second phase locked loop 700 receives as input synchronizing signals k and l output from the second sync separating and chrominance demodulating portion 202 and outputs a second clock signal m based on the signals k and l. The second clock signal m is input by the second frame memory 204 as a write clock W.

The left and right screen select switch 800 receives as input the analog video signals from the first and second DACs 105 and 205 and the left and right screen switching signal S from control signal generator 300. Subsequently, the left and right screen select switch 800 alternately outputs the analog video signals from the first DAC 105 and the second DAC 205 based on the switching signal S.

The matrix 900 inputs the video signal and converts the video signal (containing a luminance signal and color difference signals) into an RGB chrominance signal. Then, the RGB chrominance signal is output from the matrix 900 as visual information to the CRT screen having a 16-to-9 aspect ratio.

FIGS. 2A to 2C illustrate waveforms relating to some of the signals output by the control signal generator 300. Specifically FIG. 2A shows the waveform of the read enable signal E output from the generator to the first frame memory 104, and FIG. 2B illustrates the waveform of read enable signal E supplied to second frame memory 204. In addition, FIG. 2C shows the waveform of the left and right screen switching signal S output to left and right screen select switch 800.

The detailed operation of the double-screen simultaneous viewing circuit shown in FIG. 1 is as follows. Television signals are supplied to the tuner 101 via the antenna 100. The tuner 101 inputs a television signal on a selected channel and converts the signal into an IF composite video signal. The IF composite video signal is output to first sync separating and chrominance demodulating portion 102, and the first sync separating and chrominance demodulating portion 102 extracts a vertical synchronizing signal a, a horizontal synchronizing signal b, and a first video signal from the received IF composite video signal.

The first video signal includes a luminance signal (Y) and color difference signals (R-Y and B-Y) and is converted into a digital video signal in the first ADC 103. For example, the luminance signal (Y) and the color difference signals (R-Y and B-Y) can be converted into 8-bit digital video signals, respectively, and the digital video signals are stored in first frame memory 104.

The synchronizing signals a and b are also output to first phase locked loop 500, and the first phase locked loop 500 generates the first and third clock signals i and j which are phase-locked by the synchronizing signals a and b. In the preferred embodiment of the present invention, the frequency of the first clock signal i is 4 $f_{sc}$, and the frequency of the third clock signal j is 8 $f_{sc}$. (The term "$f_{sc}$" indicates the frequency of a chrominance subcarrier).

The first and third clock signals i and j are input to the switch 600, and the switch selectively outputs either the first clock signal i or the third clock signal j to the first and second frame memories 104 and 204 as a read clock R. During the single-screen viewing mode, the switch selectively outputs the first clock signal i to the memories 104 and 204. On the other hand, during the double-screen simultaneous viewing mode, the third clock signal j (which has a frequency twice as much as the first clock signal i) is output as the read clocks R of the memories 104 and 204. As a result, twice as many digital video signals are read from the frame memories 104 and 204 while they are enabled during the double-screen simultaneous viewing mode as compared to the single screen viewing mode. Moreover, regardless of whether the circuit is operating under the single or double-screen simultaneous viewing mode, the first clock signal i is input by the first frame memory 104 as a write clock W to synchronize the writing of digital video signals from the first ADC 103 to the memory 104.

In order to output the stored digital video signals from the first frame memory 104, the memory 104 is enabled by the read enable signal E output from the control signal generator 300 (see FIG. 2A). Subsequently, the digital signals are read from the memory 104 according to read clock R output from the switch 600. The first digital video signals read from first frame memory 104 are converted into first analog video signals in the first DAC 105, and the analog signals are output to left and right screen select switch 800.

Meanwhile, television signals are also supplied to the second tuner 201 via the antenna 100. As in the case of the first tuner 101, the tuner 201 inputs a television signal on a selected channel and converts the signal into an IF composite video signal. The IF composite video signal is output to the second sync separating and chrominance demodulating portion 202, and the second sync separating and chrominance demodulating portion 202 extracts horizontal and vertical synchronizing signals k and l and a second video signal from the received IF composite video signal.

The second video signal includes a luminance signal (Y) and color difference signals (R-Y and B-Y) and is converted into a second digital video signal in the second ADC 203. Subsequently, the digital video signal is input to the second frame memory 204.

The synchronizing signals k and l are output to the second phase locked loop 700, and the second phase locked loop 700 generates a second clock signal m which is phase-locked by the synchronizing signals k and l. In the preferred embodiment of the present invention, the frequency of the second clock signal m has the same frequency as the first clock signal i output from first phase locked loop 500. The second clock signal m is output to the second frame memory 204 as a write clock W, and the second frame memory 204 stores the second digital video signal according to the timing of the write clock W.

In order to output the stored digital signals from the second frame memory 204, the memory is enabled by the read enable signal E output from the control signal generator 300 (see FIG. 2B). Subsequently, the signals are read from the memory 204 according to the read clock R output from the switch 600. The second digital video signals read from the second frame memory 204 are converted into second analog video signals in the second DAC 205, and the analog signals are output to the left and right screen switch 800.

During the double-screen simultaneous viewing mode, the left and right screen select switch 800 alternatively outputs the first and second analog video signals respectively output from the first and second DACs 105 and 205. The timing of the left and right screen select switch 800 is based on the left and right screen switching signal S generated by the control signal generator 300 (as seen in FIG. 2C). In the preferred embodiment, the switching of the switch 800 is performed according to a horizontal scanning cycle so that the video signal output from one DAC is selected during the first half of each horizontal scanning line and that the video signal output from the other DAC is selected during the second half of the horizontal scanning line.

As a result, the video signals transmitted on the channel selected by the tuner 101 are displayed on one half of the screen of the CRT, and the video signals transmitted on the channel selected by the tuner 201 are displayed on the other half of the screen of the CRT. Moreover, the particular half of the screen on which the two sets of video signals are displayed can be changed by changing the order in which the outputs of the DACs 105 and 205 are selected by the switch 800.

FIG. 3A to FIG. 3C illustrate a situation in which pictures are simultaneously displayed on both halves of the screen when the vertical deflection current e output by the detector 400 and vertical blanking signal c output by the control signal generator 300 are not modified. Specifically, during the double-screen simultaneous viewing mode, if the waveform of the vertical deflection current e (FIG. 3A) and the waveform of the vertical blanking signal c (FIG. 3B) are the same as those in the case of single-screen viewing mode, the pictures displayed on the left and right sides of the screen are vertically distorted. For instance, if two circles are displayed on the left and right side of the screen, they are displayed as ovals as shown in FIG. 3C.

One manner to correct the above distortion is described below with reference to FIGS. 4A to 4C. The deflector 400 can be designed to input the double-screen simultaneous viewing on/off signal g from the control signal generator 300 so that the deflector 400 can determine when the circuit is operating in double-screen simultaneous viewing mode (i.e. when the signal g is "on"). During the double-screen simultaneous viewing mode, the deflector 400 outputs a modified vertical deflection current e' (shown in FIG. 4A) to vertical deflection coils of the CRT instead of the normal vertical deflection current e. Consequently, the distorted pictures are compressed lengthwise to their approximate original proportions, as shown in FIG. 4C.

Furthermore, during the double-screen simultaneous viewing, the control signal generator 300 outputs a modified blanking signal c' (shown in FIG. 4B) to the matrix 900 instead of the normal blanking signal c (shown in FIG. 3B). Due to the modified signal c', the matrix 900 produces blank areas on portions B1 and B2 on the upper and lower parts of the screen as shown FIG. 4C.

As described above, the double-screen simultaneous viewing circuit of the present invention respectively stores first and second video signals for images having 4-to-3 aspect ratios in memories according to first and second clock signals. The first and second video signals are output according to a third clock signal having a frequency twice as high as the frequencies of the first and second clock signals, and the first and second video signals are alternatively output according to a horizontal scanning cycle. Thus, the double-screen simultaneous viewing circuit is able to output two large pictures on one screen.

In addition, both of the signals are kept in phase with each other since the first and second video signals are stored in accordance with their respective synchronizing signals and since the first-and second video signals are output based on one of their synchronizing signals.

Also, since the vertical deflection current and the vertical blanking signal produced by the circuit are selectively modified during the double-screen simultaneous viewing mode, the pictures on the left and right subscreens can be displayed free of distortions.

What is claimed is:

1. A double-screen simultaneous viewing circuit for respectively displaying two pictures on left and right subscreens of a main screen in a television, wherein the double-screen simultaneous viewing circuit comprises:

first and second analog-to-digital converting means for respectively converting first and second video signals into first and second digital signals, wherein said first and second digital signals are respectively output from said first and second analog-to-digital converting means based on first and second clock signals and wherein said first and second clock signals are respectively synchronized with synchronizing signals of said first and second video signals;

first and second memory means for respectively storing said first and second digital video signals output from said first and second analog-to-digital converting means, wherein said first and second digital signals are respectively stored based on said first and second clock signals, wherein said first and second digital signals are respectively read from said first and second memory means based on a third clock signal which is synchronized with said synchronizing signals of said first video signal;

first and second digital-to-analog converting means for respectively converting said first and second digital signals output from said first and second memory means into first and second analog signals, wherein said first and second digital-to-analog converting means output said first and second analog signals based on said third clock signal; and switching means for receiving said first and second analog signals output from said first and second digital-to-analog converting means and for alternately outputting said first and second analog signals based on a left and right screen switching signal.

2. The double-screen simultaneous viewing circuit as recited in claim 1, wherein areas of said left and right subscreens are substantially equal.

3. The double-screen simultaneous viewing circuit as recited in claim 1, wherein said first and second video signals have a 4-to-3 aspect ratio.

4. The double-screen simultaneous viewing circuit as recited in claim 3,
wherein said main screen has a 16-to-9 aspect ratio, and
wherein said two pictures each have a 4-to-3 aspect ratio.

5. The double-screen simultaneous viewing circuit as recited in claim 1, wherein a frequency of said third clock signal is twice as large as a frequency of said first clock signal when a viewing mode signal corresponds to a double-screen simultaneous viewing mode.

6. The double-screen simultaneous viewing circuit as recited in claim 5, wherein a frequency of said second clock signal is equal to said frequency of said first clock signal.

7. The double-screen simultaneous viewing circuit as recited in claim 6, wherein said frequency of said third clock signal is equal to said frequency of said first clock signal when said viewing mode signal corresponds to a single-screen viewing mode.

8. The double-screen simultaneous viewing circuit as recited in claim 1, wherein said left and right screen switching signal is based on a horizontal synchronizing signal of said first video signal.

9. The double-screen simultaneous viewing circuit as recited in claim 1, further comprising:

deflecting means for generating horizontal and vertical deflection signals which are synchronized with said synchronizing signals of said first video signal.

10. The double-screen simultaneous viewing circuit as recited in claim 9, wherein said deflecting means generates a first vertical deflection signal when said double-screen simultaneous viewing circuit is operating in a single-screen viewing mode and generates a second vertical deflection signal when said double-screen simultaneous viewing circuit is operating in a double-screen simultaneous viewing mode, wherein said second vertical deflection signal vertically compresses said two pictures.

11. The double-screen simultaneous viewing circuit as recited in claim 1, further comprising:

matrix means for receiving said first and second analog signals output from said switching means and for converting said first and second analog signals into chrominance signals; and display means for displaying said chrominance signals output from said matrix means.

12. The double-screen simultaneous viewing circuit as recited in claim 11, further comprising:

control signal generating means for generating control signals, wherein said matrix means outputs said chrominance signals based on a vertical blanking signal output by said control signal generating means.

13. The double-screen simultaneous viewing circuit as recited in claim 12, wherein said control signal generating means outputs a first vertical blanking signal when said double-screen simultaneous viewing circuit is operating in a single-screen viewing mode and generates a second vertical blanking signal when said double-screen simultaneous viewing circuit is operating in a double-screen simultaneous viewing mode, and wherein said second vertical blanking signal causes said matrix means to produce blank areas on upper and lower portions of said left and right subscreens.

14. A double-screen simultaneous viewing circuit for respectively displaying two pictures on left and right subscreens of a main screen in a television, wherein the double-screen simultaneous viewing circuit comprises:

first and second analog-to-digital converting means for respectively converting first and second video signals into first and second digital signals, wherein said first and second video signals have a 4-to-3 aspect ratio, wherein said first and second digital signals are respectively output from said first and second analog-to-digital converting means based on first and second clock signals, wherein said first and second clock signals are respectively synchronized with synchronizing signals of said first and second video signals, and wherein a frequency of said first clock signal is equal to a frequency of said second clock signal;

first and second memory means for respectively storing said first and second digital signals output from said first and second analog-to-digital converting means, wherein said first and second digital signals are stored based on said first and second clock signals, wherein said first and second digital signals are respectively read from said first and second memory means based on a third clock signal which is synchronized with said synchronizing signals of said first video signal, wherein a frequency of said third clock signal is twice as large as a frequency of said first clock signal during a double-screen simultaneous viewing mode;

first and second digital-to-analog converting means for respectively converting said first and second digital signals output from said first and second memory means into first and second analog signals, wherein said first and second digital-to-analog converting means output said first and second analog signals based on said third clock signal;

switching means for receiving said first and second analog signals output from said first and second digital-to-analog converting means and for alternately outputting said first and second analog signals based on a left and right screen switching signal; and deflecting means for generating horizontal and vertical deflection signals synchronized with said synchronizing signals of said first video signal.

15. The double-screen simultaneous viewing circuit as recited in claim 14, further comprising:

matrix means for receiving said first and second analog signals output from said switching means and for converting said first and second analog signals into chrominance signals;

display means for displaying said chrominance signals output from said matrix means;

control signal generating means for generating control signals, wherein said matrix means outputs said chrominance signals based on a vertical blanking signal output by said control signal generating means.

16. The double-screen simultaneous viewing circuit as recited in claim 15, wherein said control signal generating means generates a double-screen simultaneous viewing on/off signal which indicates whether said double-screen simultaneous viewing circuit is in said double-screen simultaneous viewing mode, wherein said deflecting means inputs said double-screen simultaneous viewing on/off signal and outputs a modified vertical deflection signal when said double-screen simultaneous viewing circuit is in said double-screen simultaneous viewing mode, and wherein said modified vertical deflection signal vertically compresses said two pictures.

17. The double-screen simultaneous viewing circuit as recited in claim 16, wherein areas of said left and right subscreens are substantially equal.

18. The double-screen simultaneous viewing circuit as recited in claim 17, wherein said main screen has a 16-to-9 aspect ratio, and wherein said two pictures each have a 4-to-3 aspect ratio.

19. A double-screen simultaneous viewing circuit for respectively displaying two pictures on left and right subscreens of a main screen in a television, wherein the double-screen simultaneous viewing circuit comprises:

first and second analog-to-digital converting means for respectively converting first and second video signals into first and second digital signals, wherein said first and second digital signals are respectively output from said first and second analog-to-digital converting means based on first and second clock signals and wherein said first and second clock signals are respectively synchronized with synchronizing signals of said first and second video signals;

first and second memory means for respectively storing said first and second digital video signals output from said first and second analog-to-digital converting means, wherein said first and second digital signals are stored based on said first and second clock signals, wherein said first and second digital signals are respectively read from said third first and second memory means based on a third clock signal which is synchronized with said synchronizing signals of said first video signal;

first and second digital-to-analog converting means for respectively converting said first and second digital signals output from said first and second memory means into first and second analog signals, wherein said first and second digital-to-analog converting means output said first and second analog signals based on said third clock signal;

a frequency selection means, responsive to a viewing mode signal, for setting a frequency for said clock signal; and switching means for receiving said first and second analog signals output from said first and second digital-to-analog converting means and for alternately outputting said first and second analog signals based on a left and right screen switching signal.

20. The double-screen simultaneous viewing circuit as recited in claim 19, wherein areas of said left and right subscreens are substantially equal.

21. The double-screen simultaneous viewing circuit as recited in claim 19, wherein said first and second video signals have a 4-to-3 aspect ratio.

22. The double-screen simultaneous viewing circuit as recited in claim 19, wherein said main screen has a 16-to-9 aspect ratio, and wherein said two pictures each have a 4-to-3 aspect ratio.

23. The double-screen simultaneous viewing circuit as recited in claim 19, wherein a frequency of said third clock signal is twice as large as a frequency of said first clock signal when said viewing mode signal corresponds to a double-screen simultaneous viewing mode.

24. The double-screen simultaneous viewing circuit of claim 1, wherein said first clock signal is 4 $f_{sc}$, where $f_{sc}$ is a frequency of a chrominance subcarrier of said first video signal.

25. The double-screen simultaneous viewing circuit of claim 5, wherein said first clock signal is 4 $f_{sc}$, where $f_{sc}$ is a frequency of a chrominance subcarrier of said first video signal.

26. The double-screen simultaneous viewing circuit of claim 14, wherein said first clock signal is 4 $f_{sc}$, where $f_{sc}$ is a frequency of a chrominance subcarrier of said first video signal.

* * * * *